United States Patent
Tokudi et al.

(10) Patent No.: US 11,231,185 B2
(45) Date of Patent: Jan. 25, 2022

(54) AIR CONDITIONER

(71) Applicant: Hitachi-Johnson Controls Air Conditioning, Inc., Tokyo (JP)

(72) Inventors: Mikihito Tokudi, Tokyo (JP); Gen Yasuda, Tokyo (JP); Takanori Isogawa, Tokyo (JP); Kazuhiro Tsuchihashi, Tokyo (JP); Hiroyuki Ogisu, Tokyo (JP)

(73) Assignee: HITACHI-JOHNSON CONTROLS AIR CONDITIONING, INC., Tokyo (JP)

( * ) Notice: Subject to any disclaimer, the term of this patent is extended or adjusted under 35 U.S.C. 154(b) by 324 days.

(21) Appl. No.: 16/371,181

(22) Filed: Apr. 1, 2019

(65) Prior Publication Data

US 2019/0226691 A1 Jul. 25, 2019

Related U.S. Application Data

(63) Continuation of application No. PCT/JP2017/036550, filed on Oct. 6, 2017.

(51) Int. Cl.
*F24F 1/24* (2011.01)
*F25B 49/02* (2006.01)
(Continued)

(52) U.S. Cl.
CPC .............. *F24F 1/24* (2013.01); *F25B 1/00* (2013.01); *F25B 41/00* (2013.01); *F25B 41/30* (2021.01);
(Continued)

(58) Field of Classification Search
CPC .. F24F 1/24; F25B 41/30; F25B 41/31; F25B 41/40; F25B 41/00; F25B 1/00;
(Continued)

(56) References Cited

U.S. PATENT DOCUMENTS

2010/0192624 A1   8/2010  Teraki et al.
2012/0180510 A1*  7/2012  Okazaki ................ F25B 13/00
                                                 62/218
(Continued)

FOREIGN PATENT DOCUMENTS

CN    203633037 U    6/2014
CN    104633873 A    5/2015
(Continued)

OTHER PUBLICATIONS

Chinese Office Action received in corresponding Chinese Application No. 201780029660.4 dated Mar. 2, 2020.
(Continued)

*Primary Examiner* — Emmanuel E Duke
(74) *Attorney, Agent, or Firm* — Mattingly & Malur, PC (57) ABSTRACT

An air conditioner provided which has: a main refrigerant circuit including a compressor, a heat source side heat exchanger, a first expansion valve, and a utilization side heat exchanger and configured such that refrigerant flows in the main refrigerant circuit; a sub refrigerant circuit including a cooling member configured such that refrigerant branched from the main refrigerant circuit flows in the cooling member and configured such that refrigerant branched from the main refrigerant circuit flows in the sub refrigerant circuit; and a heat generator to be cooled by the cooling member, wherein a pipe in which part of refrigerant discharged from the compressor flows is connected to the cooling member of the sub refrigerant circuit.

7 Claims, 10 Drawing Sheets (51) Int. Cl.
　　　*F25B 1/00*　　　(2006.01)
　　　*F25B 41/00*　　(2021.01)
　　　*F25B 41/30*　　(2021.01)
　　　*F25B 41/31*　　(2021.01)
　　　*F25B 41/40*　　(2021.01)

(52) U.S. Cl.
　　　CPC .............. *F25B 41/31* (2021.01); *F25B 41/40* (2021.01); *F25B 49/02* (2013.01); *F25B 2400/075* (2013.01)

(58) Field of Classification Search
　　　CPC ................ F25B 49/02; F25B 2400/075; F25B 2313/0252; F25B 2313/0253; F25B 2313/0254; F25B 31/006; F25B 2600/2519; F25B 47/022; F25B 13/00
　　　See application file for complete search history.

(56) References Cited

U.S. PATENT DOCUMENTS

| | | | |
|---|---|---|---|
| 2013/0091885 A1 | 4/2013 | Park et al. | |
| 2013/0255292 A1 | 10/2013 | Voorhis | |
| 2014/0137588 A1* | 5/2014 | Takeichi | F25B 49/022 62/228.1 |
| 2014/0250929 A1 | 9/2014 | Takahashi et al. | |
| 2014/0326010 A1 | 11/2014 | Kawakami et al. | |
| 2015/0082823 A1* | 3/2015 | Teraki | H05K 7/20381 62/259.2 |

FOREIGN PATENT DOCUMENTS

| | | | |
|---|---|---|---|
| CN | 104640421 A | | 5/2015 |
| JP | 2005-133976 A | | 5/2005 |
| JP | 2006-170469 A | | 6/2006 |
| JP | 2011-117677 A | | 6/2011 |
| JP | 2011-122779 A | | 6/2011 |
| JP | 2013-213670 A | | 10/2013 |
| JP | 2014-102050 A | | 6/2014 |
| JP | 2014102050 A | * | 6/2014 |
| JP | 2016-121843 A | | 7/2016 |
| KR | 10 2013 0039163 A | | 4/2013 |
| WO | 2008/059803 A1 | | 5/2008 |

OTHER PUBLICATIONS

International Search Report and Written Opinion of PCT/JP2017/036550 dated Nov. 28, 2017.
Korean Office Action received in corresponding Korean Application No. 10-2019-7009997 dated Jun. 18, 2020.
Search Report and Office Action of BR112019006970-4 dated Dec. 7, 2021.

* cited by examiner

AIR CONDITIONER

CROSS-REFERENCE TO RELATED APPLICATION

The present application is a continuation application of International Application No. PCT/JP2017/036550, filed on Oct. 6, 2017. The contents of these applications are incorporated herein by reference in their entirety.

BACKGROUND

1. Technical Field

The present disclosure relates to an air conditioner.

2. Related Art

Typically, in an air conditioner configured to perform a vapor compression type refrigeration cycle by means of refrigerant circulation, an electric circuit such as an inverter circuit configured to control the rotation speed of a compressor is mounted for controlling an operation state of the compressor. Generally, a power element generating high heat due to power control or supply is used for the inverter circuit.

In the typical air conditioner, a section configured to cool the power element is provided to prevent the power element from having a higher temperature than an operable temperature. A refrigerant cooling technique for cooling the power element by refrigerant flowing in a refrigerant circuit has been proposed as one example of such a cooling section.

JP-A-2006-170469 (FIGS. 1 and 4 and the like) describes that a "main refrigerant circuit (11) including a compressor (32), a heat source side heat exchanger (30), a first expansion valve (34), and a utilization side heat exchanger (20) and configured such that refrigerant flows in the main refrigerant circuit (11)" and a "branched refrigerant circuit (12) configured such that refrigerant branched from the main refrigerant circuit (11) flows in the branched refrigerant circuit (12)" are provided, a "second expansion valve (61, 62) provided at the branched refrigerant circuit (12) and configured to expand refrigerant flowing into a cooling section (53) and a control section (60) configured to control the second expansion valve (61, 62) are further provided," and therefore, "the cooling capacity of the cooling section (53) can be controlled and the temperature of an electric component (50a to 50d) (see attached FIG. 4) can be properly adjusted."

JP-A-2011-117677 (FIG. 1 and the like) describes that "multiple compressors (23A, 23B) are provided, a refrigerant adjustment mechanism adjusts the amount of refrigerant supplied to each cooling section (37A, 37B) corresponding to a power substrate (35A, 35B) of each compressor (23A, 23B) according to operation or performance of each compressor (23A, 23B) in a case where the power substrate (35A, 35B) and the cooling section (37A, 37B) are provided for each compressor (23A, 23B)," and therefore, "cooling of the electric components (35A, 35B) by refrigerant flowing in a refrigerant circuit (18) can be more efficiently performed."

SUMMARY

An air conditioner of an embodiment of the present disclosure includes a main refrigerant circuit including a compressor, a heat source side heat exchanger, a first expansion valve, and a utilization side heat exchanger and configured such that refrigerant flows in the main refrigerant circuit; a sub refrigerant circuit including a cooling member configured such that refrigerant branched from the main refrigerant circuit flows in the cooling member and configured such that refrigerant branched from the main refrigerant circuit flows in the sub refrigerant circuit; and a heat generator to be cooled by the cooling member, wherein a pipe in which part of refrigerant discharged from the compressor flows is connected to the cooling member of the sub refrigerant circuit.

DESCRIPTION OF THE EMBODIMENTS

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

When the temperature of refrigerant cooling the power element becomes too low, the surface temperature of the power element or the surrounding temperature thereof reaches lower than the dew-point temperature of surrounding air, and therefore, there is a probability that dew condensation occurs at a surface of the power element or the periphery thereof.

However, in the case of the structure disclosed in JP-A-2011-117677 (FIG. 1 and the like), i.e., in a case where the multiple power elements are cooled by the cooling sections, the power element corresponding to the operating compressor generates heat, and on the other hand, the power element corresponding to the stopped compressor does not generate heat. Even in this case, all of the power elements are cooled by the cooling sections. Thus, the power element corresponding to the stopped compressor and the periphery thereof reach equal to or lower than a dew point, and there is a probability that dew condensation occurs.

Moreover, even in the case of the structure disclosed in JP-A-2006-170469 (FIGS. 1 and 4 and the like), i.e., a case where the expansion valve is provided at the branched refrigerant circuit to control the cooling capacity of the cooling section, all of the power elements are cooled by the cooling section. Thus, the power element corresponding to the stopped compressor and the periphery thereof reach equal to or lower than the dew point, and there is a probability that dew condensation occurs.

An air conditioner of the present embodiment has been made in view of the above-described situation, and is intended to provide an air conditioner configured so that occurrence of dew condensation at a heat generator and the periphery thereof can be reduced.

For solving the above-described problems, an air conditioner of an embodiment of the present disclosure includes a main refrigerant circuit including a compressor, a heat source side heat exchanger, a first expansion valve, and a utilization side heat exchanger and configured such that refrigerant flows in the main refrigerant circuit, a sub refrigerant circuit including a cooling member configured such that refrigerant branched from the main refrigerant circuit flows in the cooling member and configured such that refrigerant branched from the main refrigerant circuit flows in the sub refrigerant circuit, and a heat generator to be cooled by the cooling member. A pipe in which part of refrigerant discharged from the compressor flows is connected to the cooling member of the sub refrigerant circuit.

An air conditioner of another embodiment of the present disclosure includes a main refrigerant circuit including a compressor, a heat source side heat exchanger, a first expansion valve, and a utilization side heat exchanger and configured such that refrigerant flows in the main refrigerant circuit, a sub refrigerant circuit including a cooling member configured such that refrigerant branched from the main refrigerant circuit flows in the cooling member and configured such that refrigerant branched from the main refrigerant circuit flows in the sub refrigerant circuit, a heat generator to be cooled by the cooling member, and a pipe in which part of refrigerant discharged from the compressor flows into the cooling member. The pipe is connected to the main refrigerant circuit.

According to the present embodiment, in an air conditioner including a cooler configured to cool multiple heat generators by refrigerant flowing in a refrigerant circuit, occurrence of dew condensation at the heat generator corresponding to a stopped one of the multiple heat generators and the periphery thereof can be reduced.

Hereinafter, embodiments of the present disclosure will be described with reference to the drawings. Unless otherwise specified below, refrigerant or a refrigeration cycle indicates refrigerant or a refrigeration cycle available for cooling, heating, or both.

First Embodiment

Figure 1A:
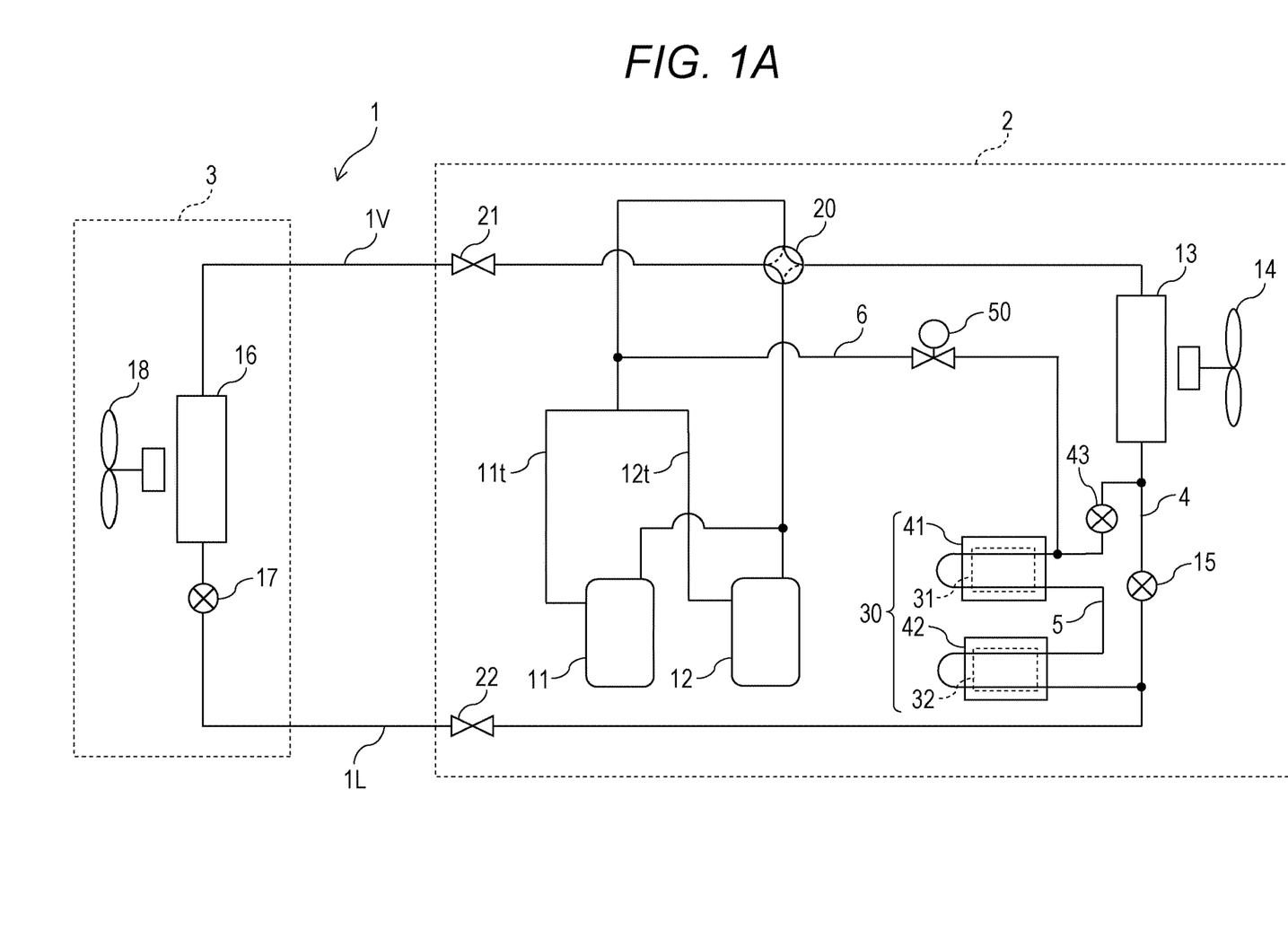
FIG. 1A is a diagram of a refrigeration cycle of an air conditioner according to a first embodiment.
Figure 1B:
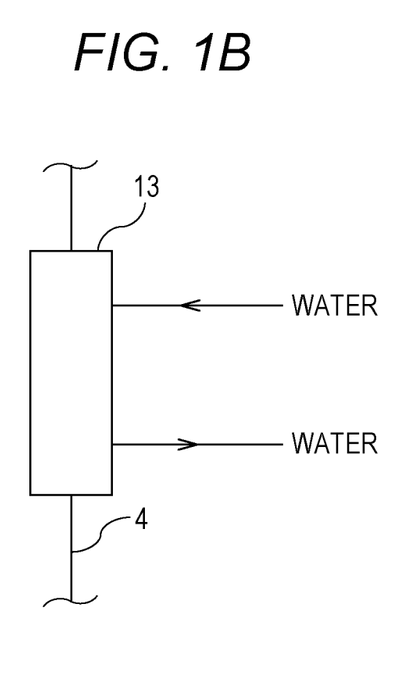
FIG. 1B is a diagram in a case where a heat source side heat exchanger according to the first embodiment is a heat exchanger configured to exchange heat between water and refrigerant.

FIG. 1A is a diagram of a refrigeration cycle of an air conditioner 1 according to a first embodiment. FIG. 1B is a diagram in a case where a heat source side heat exchanger 13 according to the first embodiment is a heat exchanger configured to exchange heat between water and refrigerant.

The air conditioner 1 according to the first embodiment as illustrated in FIG. 1A includes a heat source device 2 (e.g., an outdoor device) configured to supply heat, and a utilization device 3 (e.g., an indoor device) configured to performing cooling/heating by means of such a heat. The heat source device 2 and the utilization device 3 are connected to each other via refrigerant pipes 1L, 1V. The number of heat source devices 2 and the number of utilization devices 3 are not limited to one, and multiple heat source devices 2 and multiple utilization devices 3 may be provided.

The utilization device 3 includes a utilization side expansion valve 17 as a depressurization device on a utilization device 3 side, a utilization side heat exchanger 16, and an air blower 18. The air blower 18 is configured to send air into the utilization side heat exchanger 16 to promote heat exchange with air in the utilization side heat exchanger 16.

The heat source device 2 has a main refrigerant circuit 4, a branched refrigerant circuit (a sub refrigerant circuit) 5, and a discharged gas branching refrigerant circuit (pipe) 6.

The main refrigerant circuit 4 is a main circuit for performing, e.g., cooling/heating by the air conditioner 1.

The branched refrigerant circuit 5 is a circuit in which low-temperature refrigerant flows to cool power elements (heat generators) 31, 32 used for control of the air conditioner 1.

The discharged gas branching refrigerant circuit 6 is a circuit in which high-temperature refrigerant flows to reduce frosting of the power elements 31, 32.

<Main Refrigerant Circuit 4>

The main refrigerant circuit 4 is a circuit connected to main components of the heat source device 2.

The main refrigerant circuit 4 includes a first compressor 11, a second compressor 12, a four-way valve 20 functioning to switch a refrigerant flow path direction between cooling operation and heating operation, a gas side closing valve 21, a liquid side closing valve 22, the heat source side heat exchanger 13, and a first expansion valve 15 as a depressurization device on a heat source device 2 side.

The heat source device 2 described herein includes an air blower 14 configured to send air into the heat source side heat exchanger 13 to promote heat exchange in a case where the heat source side heat exchanger 13 is a heat exchanger configured to exchange heat between air and refrigerant flowing in the main refrigerant circuit 4.

Note that as illustrated in FIG. 1B, the air blower 14 can be omitted in a case where the heat source side heat exchanger 13 is the heat exchanger configured to exchange heat between water and refrigerant.

<Cooling Operation>

In the cooling operation of the air conditioner 1, refrigerant discharged from the first and second compressors 11, 12 flows into the heat source side heat exchanger 13 through the four-way valve 20. Such refrigerant releases heat to air or water by heat exchange, and is condensed. High-pressure gas refrigerant discharged from the first and second compressors 11, 12 turns into high-pressure liquid refrigerant by heat exchange in the heat source side heat exchanger 13. When passing through the first expansion valve 15, the high-pressure liquid refrigerant is depressurized according to the degree of opening of the first expansion valve 15.

That is, the refrigerant is less depressurized as the degree of opening of the first expansion valve 15 increases, and is more depressurized as the degree of opening of the first expansion valve 15 decreases. Note that in the cooling operation, the first expansion valve 15 is sometimes in a fully-open state. The liquid refrigerant depressurized by the first expansion valve 15 is sent to the utilization device 3 by way of the liquid side closing valve 22 and the refrigerant pipe 1L.

The low-pressure liquid refrigerant (or the refrigerant in an air-liquid two-phase state) sent to the utilization device 3 is further depressurized when passing through the utilization side expansion valve 17, and is sent to the utilization side heat exchanger 16. The low-pressure refrigerant sent in the air-liquid two-phase state to the utilization side heat exchanger 16 absorbs heat by heat exchange with indoor air, and cooling is performed. Such refrigerant is evaporated into low-pressure gas refrigerant. The low-pressure gas refrigerant is sent to the heat source device 2 by way of the refrigerant pipe 1V, and is sucked into the first and second compressors 11, 12 by way of the gas side closing valve 21 and the four-way valve 20.

<Heating Operation>

In the heating operation of the air conditioner 1, refrigerant discharged from the first and second compressors 11, 12 is sent to the utilization device 3 by way of the four-way valve 20, the gas side closing valve 21, and the refrigerant pipe 1V. The high-pressure gas refrigerant sent to the utilization device 3 releases heat by heat exchange with indoor air in the utilization side heat exchanger 16, and heating is performed. By heat exchange in the utilization side heat exchanger 16, the high-pressure gas refrigerant releases heat, and is condensed into high-pressure liquid refrigerant. When passing through the utilization side expansion valve 17, the high-pressure liquid refrigerant is depressurized according to the degree of opening of the utilization side expansion valve 17. Note that the utilization side expansion valve 17 is sometimes in a fully-open state.

The refrigerant having passed through the utilization side expansion valve 17 is sent to the heat source device 2 by way of the refrigerant pipe 1L. The liquid refrigerant sent to the heat source device 2 is further depressurized according to the degree of opening when passing through the first expansion valve 15 by way of the liquid side closing valve 22, and flows into the heat source side heat exchanger 13. The low-pressure refrigerant flowing into the heat source side heat exchanger 13 in an air-liquid two-phase state absorbs heat from external air or water, and is evaporated. Thus, the low-pressure refrigerant in the air-liquid two-phase state turns into low-pressure gas refrigerant. The low-pressure gas refrigerant having flowed out of the heat source side heat exchanger 13 is sucked into the first and second compressors 11, 12 by way of the four-way valve 20.

<Branched Refrigerant Circuit 5>

The branched refrigerant circuit 5 is a circuit in which refrigerant branched from the main refrigerant circuit 4 flows. The branched refrigerant circuit 5 is configured to cool the power elements 31, 32 generating heat.

The branched refrigerant circuit 5 is provided in parallel with the main refrigerant circuit 4 at a portion from a portion between the heat source side heat exchanger 13 and the first expansion valve 15 of the main refrigerant circuit 4 to a portion between the first expansion valve 15 and the liquid side closing valve 22. The branched refrigerant circuit 5 includes a cooling member 41 for the power element 31, a cooling member 42 for the power element 32, and a second expansion valve 43.

By means of the second expansion valve 43, the branched refrigerant circuit 5 is brought into a use state only in the case of cooling the power elements 31, 32. On the other hand, in a case where the power elements 31, 32 do not need to be cooled, the second expansion valve 43 is closed, and the branched refrigerant circuit 5 is brought into a non-use state.

The cooling member 41 is a member configured to cool the power element 31 of which the temperature is high due to heat generation. The cooling member 42 is a member configured to cool the power element 32 of which the temperature is high due to heat generation.

In the cooling operation, part of refrigerant flowing in the main refrigerant circuit 4 is branched into the branched refrigerant circuit 5 from the portion between the heat source side heat exchanger 13 and the first expansion valve 15. The branched refrigerant flows in the second expansion valve 43, the cooling member 41, and the cooling member 42 in this order, and joins the main refrigerant circuit 4 at the portion between the first expansion valve 15 and the liquid side closing valve 22.

On the other hand, in the heating operation, part of refrigerant flowing in the main refrigerant circuit 4 is branched into the branched refrigerant circuit 5 from the portion between the liquid side closing valve 22 and the first expansion valve 15. The branched refrigerant flows, contrary to the cooling operation, in the cooling member 42, the cooling member 41, and the second expansion valve 43 in this order, and joins the main refrigerant circuit 4 at a position between the first expansion valve 15 and the heat source side heat exchanger 13. That is, the flow of refrigerant in the branched refrigerant circuit is reversed between the cooling operation and the heating operation.

The flow rate of refrigerant flowing in the branched refrigerant circuit 5 may be the same as the flow rate of refrigerant flowing in the main refrigerant circuit 4, but may be lower than the flow rate of refrigerant flowing in the main refrigerant circuit 4. In the former case, the cooling capacities of the cooling members 41, 42 are increased, and therefore, overheating of the power elements 31, 32 can be reduced. In the latter case, the cooling capacities of the cooling members 41, 42 are decreased, and therefore, overcooling of the power elements 31, 32 can be prevented. Thus, dew condensation at the power elements 31, 32 and the periphery thereof can be reduced.

Note that in an example of FIG. 1A, the power element 31 of the power elements 31, 32 and the cooling member 41 of the cooling members 41, 42 are provided near the second expansion valve 43, but the power element 32 and the cooling member 42 may be provided near the second expansion valve 43.

<Discharged Gas Branching Refrigerant Circuit 6>

The discharged gas branching refrigerant circuit 6 is a circuit configured to heat the power elements 31, 32 to reduce frosting of the power elements 31, 32. In the discharged gas branching refrigerant circuit 6, refrigerant branched from discharge pipes 11*t*, 12*t* of the first and second compressors 11, 12 flows.

The discharged gas branching refrigerant circuit 6 is provided in parallel with the main refrigerant circuit 4 at a portion from a portion between each of the first and second compressors 11, 12 and the four-way valve 20 to a portion between the second expansion valve 43 and the cooling member 41, 42.

The discharged gas branching refrigerant circuit 6 includes an electromagnetic valve 50 configured to switch the discharged gas branching refrigerant circuit 6 between the use state and the non-use state.

The electromagnetic valve 50 is closed in a normal state (a steady state), and the discharged gas branching refrigerant circuit 6 is in the non-use state. When the electromagnetic valve 50 is opened, part of high-pressure high-temperature gas refrigerant discharged from the first and second compressors 11, 12 flows into the discharged gas branching refrigerant circuit 6 from the portion between each of the first and second compressors 11, 12 and the four-way valve 20, and the discharged gas branching refrigerant circuit 6 is brought into the use state. Such refrigerant joins the branched refrigerant circuit 5 at the portion between the second expansion valve 43 and the cooling member 41, 42.

<Inverter Device 30>

Figure 2A:
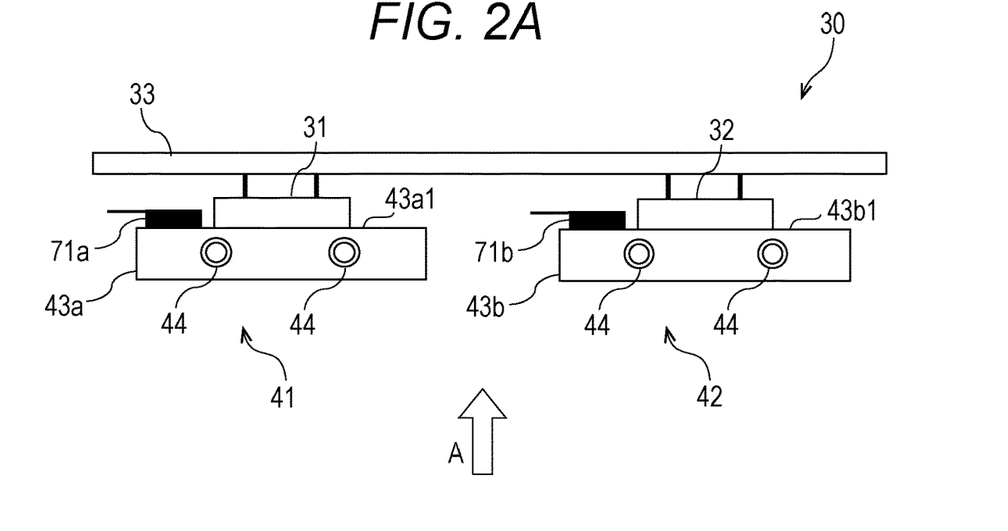
FIG. 2A is a partial front view of an inverter device.
Figure 2B:
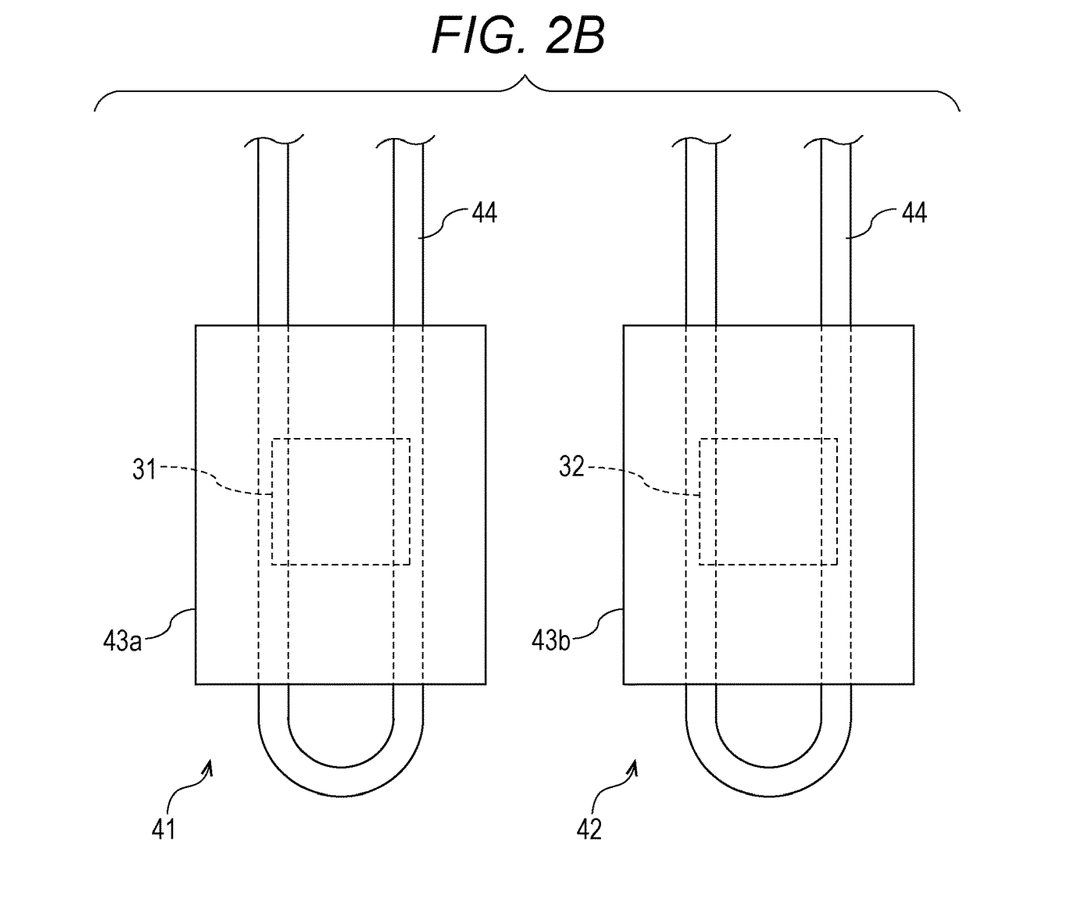
FIG. 2B is a partial view of the inverter device from the direction of an arrow A.

FIG. 2A is a partial front view of an inverter device 30, and FIG. 2B is a partial view of the inverter device 30 from the direction of an arrow A.

The inverter device 30 is a circuit configured to control the power of the air conditioner 1, and the temperature thereof is increased due to heat generation from the power elements 31, 32 as components.

As illustrated in FIG. 2A, the power elements 31, 32 are attached to one side of a printed-circuit board 33 in the inverter device 30.

As illustrated in FIG. 2B, the cooling members 41, 42 include refrigerant jackets 43a, 43b made of a metal with high thermal conductivity, such as aluminum or copper, and a refrigerant pipe 44 embedded in each of the refrigerant jackets 43a, 43b. Refrigerant branched from the main refrigerant circuit 4 flows in the refrigerant pipe 44 in the branched refrigerant circuit 5 (see FIG. 1A). The cooling members 41, 42 in which refrigerant flows form a cooler.

Note that as long as the thermal conductivity is high, other materials than metal may be used for the refrigerant jackets 43a, 43b.

As illustrated in FIG. 2A, the refrigerant jackets 43a, 43b are formed in a slightly-thick flat plate shape to increase a thermal capacity. Each of the refrigerant jackets 43a, 43b is attached to one side of a corresponding one of the power elements 31, 32.

That is, one surface 43a1, 43b1 of each of the refrigerant jackets 43a, 43b closely contacts one surface of a corresponding one of the power elements 31, 32. Refrigerant flowing in the refrigerant pipe 44 of the branched refrigerant circuit 5 absorbs heat from the power elements 31, 32 via the refrigerant jackets 43a, 43b.

The cooling members 41, 42 each include cooling section temperature sensors 71a, 71b. The cooling section temperature sensors 71a, 71b are configured to sense the surface temperatures of the refrigerant jackets 43a, 43b. Thus, each of the cooling section temperature sensors 71a, 71b is attached to one surface 43a1, 43b1 of a corresponding one of the cooling members 41, 42 contacting the power element 31, 32. Note that the cooling section temperature sensors 71a, 71b may be each provided in the power elements 31, 32, or may be provided on the surfaces of the power elements 31, 32.

<Control System of Air Conditioner 1>

Figure 3:
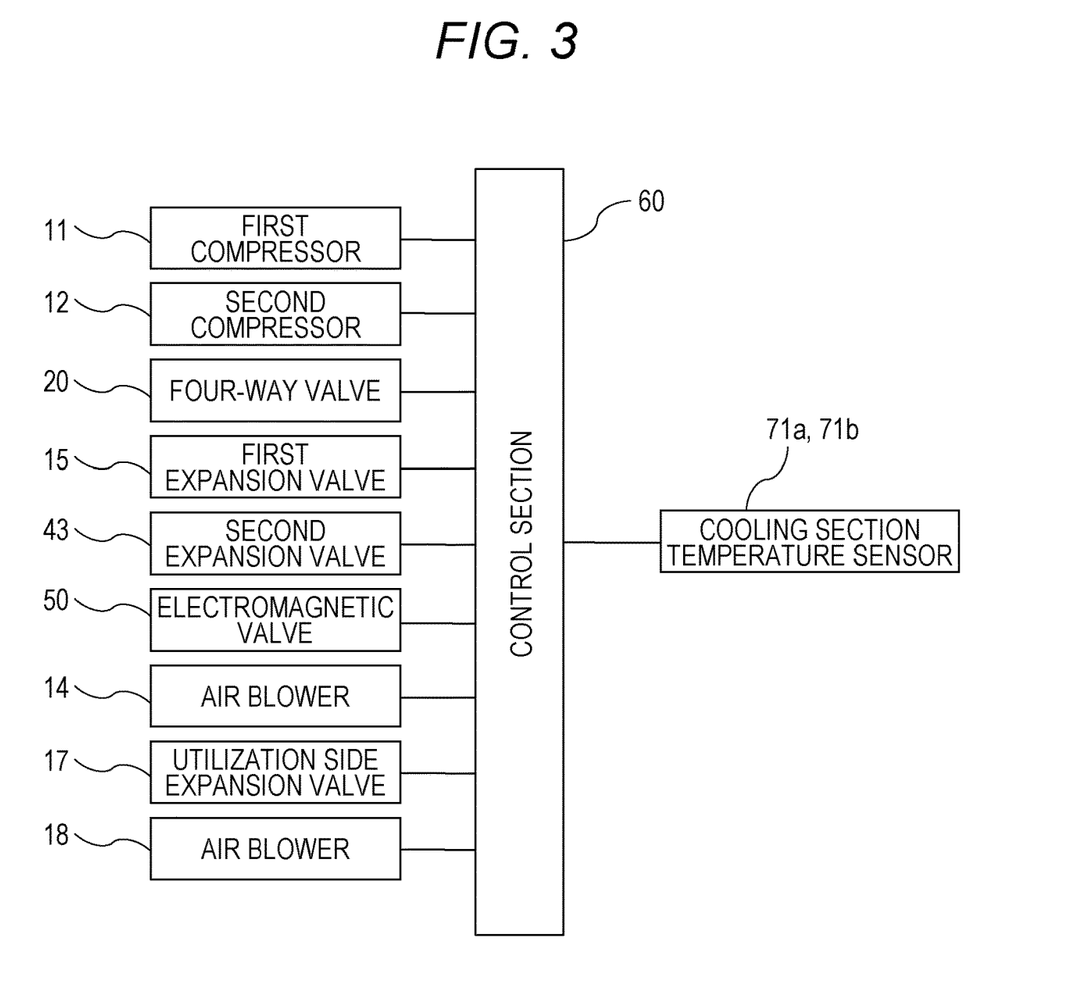
FIG. 3 is a diagram of a control system of the air conditioner.

FIG. 3 is a diagram of a control system of the air conditioner 1.

A control section 60 is configured to control operation of the air conditioner 1 based on detection signals received from various sensors provided at the air conditioner 1. The control section 60 may be provided at the heat source device 2, or may be provided at the utilization device 3. Alternatively, the control section 60 may be provided separately at the heat source device 2 and the utilization device 3 in terms of functions.

The control section 60 includes, for example, a not-shown microcomputer.

The control section 60 controls the first and second compressors 11, 12 (the power elements 31, 32), the four-way valve 20, the first expansion valve 15, the second expansion valve 43, the electromagnetic valve 50, and the air blower 14 mounted on the heat source device 2, the utilization side expansion valve 17, and the air blower 18. Measurement values of the cooling section temperature sensors 71a, 71b each placed at the cooling members 41, 42 are input as control information to the control section 60.

<Control Flow of Air Conditioner 1>

Figure 4:
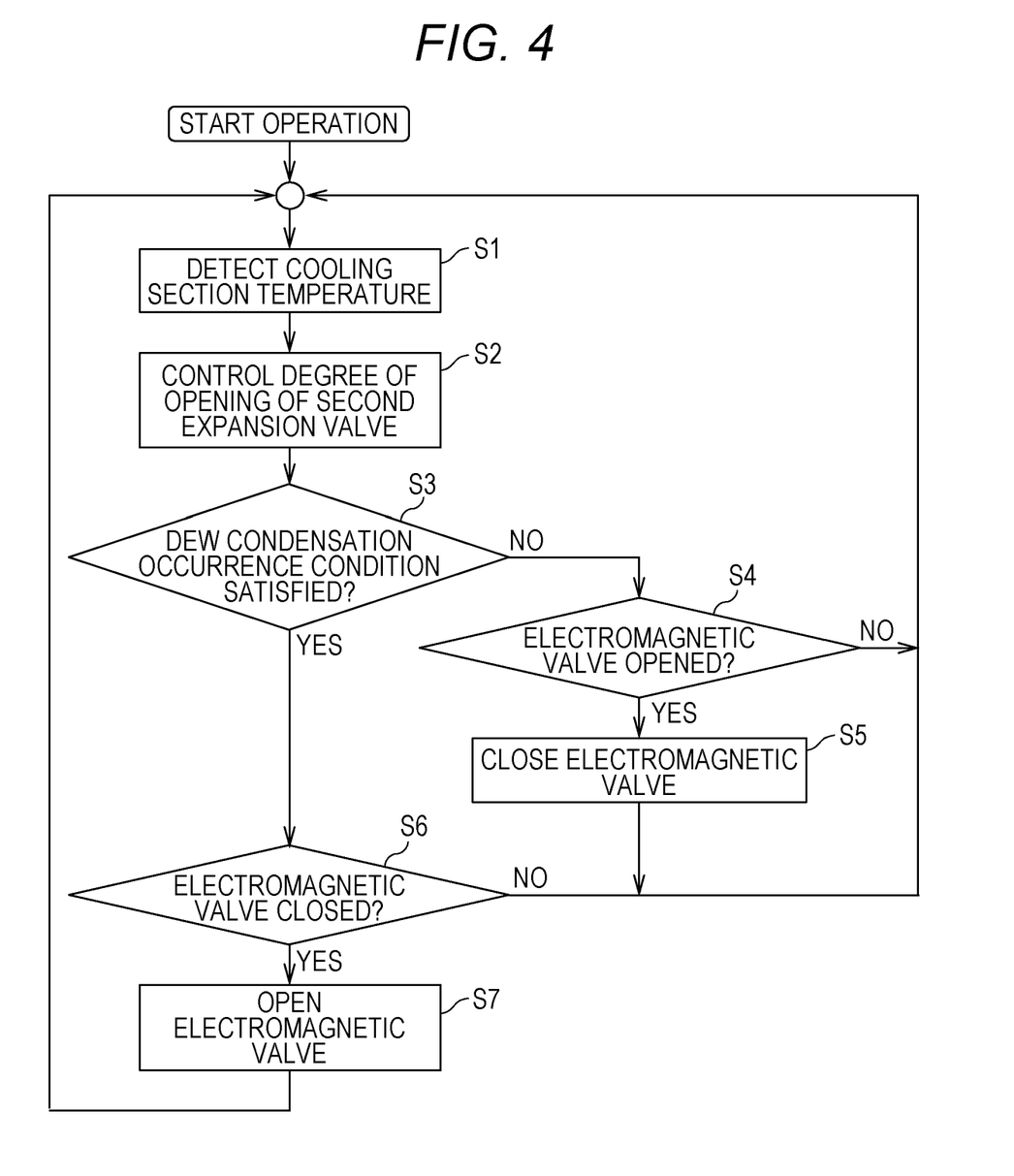
FIG. 4 is a chart of a control flow of the air conditioner of the first embodiment.

Hereinafter, a specific control flow of the air conditioner 1 will be described with reference to a control flowchart illustrated in FIG. 4. FIG. 4 is a chart of the control flow of the air conditioner 1 of the first embodiment.

The control flow of the air conditioner 1 is executed by the microcomputer mounted on the control section 60 (see FIG. 3) provided at the heat source device 2, for example.

When operation of the air conditioner 1 begins, the control section 60 detects, at a step S1, each of the cooling section temperatures of the refrigerant jackets 43a, 43b by the cooling section temperature sensors 71a, 71b (FIG. 2A).

Subsequently, at a step S2, the control section 60 adjusts the degree of opening of the second expansion valve 43 of the branched refrigerant circuit 5 such that each of the cooling section temperatures of the refrigerant jackets 43a, 43b detected at the step S1 reaches a target cooling section temperature. Specifically, in a case where each of the cooling section temperatures of the refrigerant jackets 43a, 43b is higher than the target cooling section temperature, the second expansion valve 43 is opened to promote cooling, and the flow rate of refrigerant flowing in the cooling members 41, 42 is increased. On the other hand, in a case where the cooling section temperatures of the refrigerant jackets 43a, 43b are lower than the target cooling section temperature, the second expansion valve 43 is closed, and the flow rate of refrigerant flowing in the cooling members 41, 42 is decreased. Note that refrigerant flows in the second expansion valve 43, the cooling member 41, and the cooling member 42 in this order in the cooling operation, and flows in the cooling member 42, the cooling member 41, and the second expansion valve 43 in this order in the heating operation.

The target cooling section temperature described herein may be a fixed temperature. Alternatively, a necessary cooling capacity changes according to the amount of heat generation from the power elements 31, 32, and therefore, the target cooling section temperature may be a variable temperature value according to, e.g., each of the rotation speeds of the first and second compressors 11, 12 or an inverter current value. Moreover, according to the temperature of refrigerant flowing in the cooling members 41, 42, the cooling capacities of the cooling members 41, 42 as the cooler change. Thus, the target cooling section temperature may be a variable temperature value according to the temperature of refrigerant flowing in the cooling members 41, 42 illustrated in FIG. 2A or the temperature of refrigerant therearound. Note that for reducing occurrence of dew condensation, the target cooling section temperature is set higher than a later-described dew condensation temperature.

At a step S3, the control section 60 determines whether or not a dew condensation occurrence condition under which it is determined that dew condensation might occur at the power elements 31, 32 or a member therearound is satisfied.

In a case where the dew condensation occurrence condition is not satisfied (NO at the step S3), the control section 60 transitions to a step S4. On the other hand, in a case where the dew condensation occurrence condition is satisfied (YES at the step S3), the control section 60 transitions to a step S6.

Determination on whether or not the dew condensation occurrence condition is satisfied as described herein is made based on whether or not the temperatures of the cooling section temperature sensors 71a, 71b fall below the dew condensation temperature. The dew condensation temperature may be a fixed temperature value, or may be a variable temperature value according to the surrounding temperatures of the power elements 31, 32 or the refrigerant jackets 43a, 43b, considering that a dew-point temperature changes according to the surrounding temperatures of the power elements 31, 32 or the refrigerant jackets 43a, 43b.

At the step S4, the control section 60 determines whether or not the electromagnetic valve 50 is opened. In a case where the electromagnetic valve 50 is not opened (NO at the step S4), the control section 60 returns to the step S1. In a case where the electromagnetic valve 50 is opened (YES at the step S4), the control section 60 transitions to a step S5.

At the step S5, the control section 60 returns to the step S1 after the electromagnetic valve 50 has been closed. That is, the electromagnetic valve is closed.

At the step S6, the control section 60 determines whether or not the electromagnetic valve 50 is closed. In a case where the electromagnetic valve 50 is not closed (NO at the step S6), the control section 60 returns to the step S1. In a case where the electromagnetic valve 50 is closed (YES at the step S6), the control section 60 transitions to a step S7.

At the step S7, the control section 60 returns to the step S1 after the electromagnetic valve 50 has been opened.

As described above, in a case where the multiple power elements 31, 32 are cooled by the cooling members 41, 42, the power element 31 corresponding to the operating first compressor 11 generates heat, and on the other hand, the power element 32 corresponding to the stopped second compressor 12 does not generate heat, for example. Even in this case, all of the power elements 31, 32 are cooled by the cooling members 41, 42. Thus, there is a probability that the temperature of the power element 32 corresponding to the stopped second compressor 12 and the surrounding temperature thereof decrease to equal to or lower than a dew point and dew condensation occurs.

Even in a case where the second expansion valve 43 is provided at the branched refrigerant circuit 5 to control the cooling capacity of a cooling section, all of the power elements 31, 32 are cooled by the cooling members 41, 42. Thus, there is a probability that the temperature of the power element 32 corresponding to the stopped second compressor 12 and the surrounding temperature thereof decrease to equal to or lower than the dew point and dew condensation occurs.

Determination on whether or not dew condensation occurs at the power elements 31, 32 and the periphery thereof is made based on whether or not the temperatures of the cooling members 41, 42 fall below the dew-point temperature corresponding to the surrounding temperatures of the power elements 31, 32 or the refrigerant jackets 43a, 43b. Specifically, as illustrated in FIG. 1B, in a case where the heat source side heat exchanger 13 is the heat exchanger configured to exchange heat between water and refrigerant, a water temperature and the surrounding temperatures of the power elements 31, 32 or the refrigerant jackets 43a, 43b do not depend on each other, and the surrounding temperatures of the power elements 31, 32 or the refrigerant jackets 43a, 43b might be high even in a case where the water temperature is low.

When the water temperature is low, the temperature of refrigerant flowing in the cooling members 41, 42 also decreases. Thus, in this case, when the surrounding temperatures of the power elements 31, 32 or the refrigerant jackets 43a, 43b are high, the probability of occurrence of dew condensation at the power elements 31, 32 and the periphery thereof is increased.

When the electromagnetic valve 50 is opened, part of high-pressure high-temperature gas refrigerant discharged from the first and second compressors 11, 12 flows into the discharged gas branching refrigerant circuit 6 from the portion between each of the first and second compressors 11, 12 and the four-way valve 20, and joins the branched refrigerant circuit 5 between the second expansion valve 43 and the cooling member 41, 42.

In a case where the temperatures of the cooling members 41, 42 fall below the dew condensation temperature, the control section 60 controls the second expansion valve 43 of the branched refrigerant circuit 5 in a closing direction, and therefore, the flow rate of refrigerant flowing in the second expansion valve 43 is decreased.

Thus, in the case of the cooling operation, most of refrigerant having joined the branched refrigerant circuit 5 flows in the cooling member 41 and the cooling member 42 in this order, and joins the main refrigerant circuit 4 at the portion between the first expansion valve 15 and the liquid side closing valve 22.

On the other hand, in the case of the heating operation, the second expansion valve 43 is similarly closed such that most of refrigerant having joined the branched refrigerant circuit 5 flows in the cooling member 41 and the cooling member 42 in this order and joins the main refrigerant circuit 4 at the portion between the first expansion valve 15 and the liquid side closing valve 22.

Thus, by refrigerant from the discharged gas branching refrigerant circuit 6, the temperatures of the cooling members 41, 42 having fallen below the dew condensation temperature can be increased, and occurrence of dew condensation at the power elements 31, 32 or the periphery thereof can be prevented.

Even in a case where both of the first and second compressors 11, 12 are in operation, if the temperatures of the cooling members 41, 42 fall below the dew condensation temperature, the electromagnetic valve 50 can be opened to increase the temperatures of the cooling members 41, 42.

As described above, the air conditioner 1 includes the main refrigerant circuit 4 and the branched refrigerant circuit 5. The main refrigerant circuit 4 includes the first and second compressors 11, 12, the heat source side heat exchanger 13, the first expansion valve 15, and the utilization side heat exchanger 16, and refrigerant flows in the main refrigerant circuit 4. The branched refrigerant circuit 5 includes a pipe of the discharged gas branching refrigerant circuit 6 in which part of refrigerant discharged from the first and second compressors 11, 12 flows, and refrigerant branched from the main refrigerant circuit 4 flows in the branched refrigerant circuit 5.

In the air conditioner 1, high-temperature refrigerant discharged from the first and second compressors 11, 12 flows in the branched refrigerant circuit 5 as the sub refrigerant circuit so that the temperature of refrigerant flowing in the cooling members 41, 42 can be increased, and therefore, the surface temperatures of the power elements 31, 32 or the surrounding temperature thereof can be held higher than the dew-point temperature of surrounding air. Thus, frosting of the multiple power elements 31, 32 or the periphery thereof can be reduced.

Moreover, the flow rate of refrigerant flowing in the branched refrigerant circuit 5 as the sub refrigerant circuit is decreased as compared to the flow rate of refrigerant flowing in the main refrigerant circuit 4 so that lowering of performance in the cooling operation or the heating operation can be suppressed and frosting of the power elements 31, 32 can be reduced.

Second Embodiment

Figure 5:
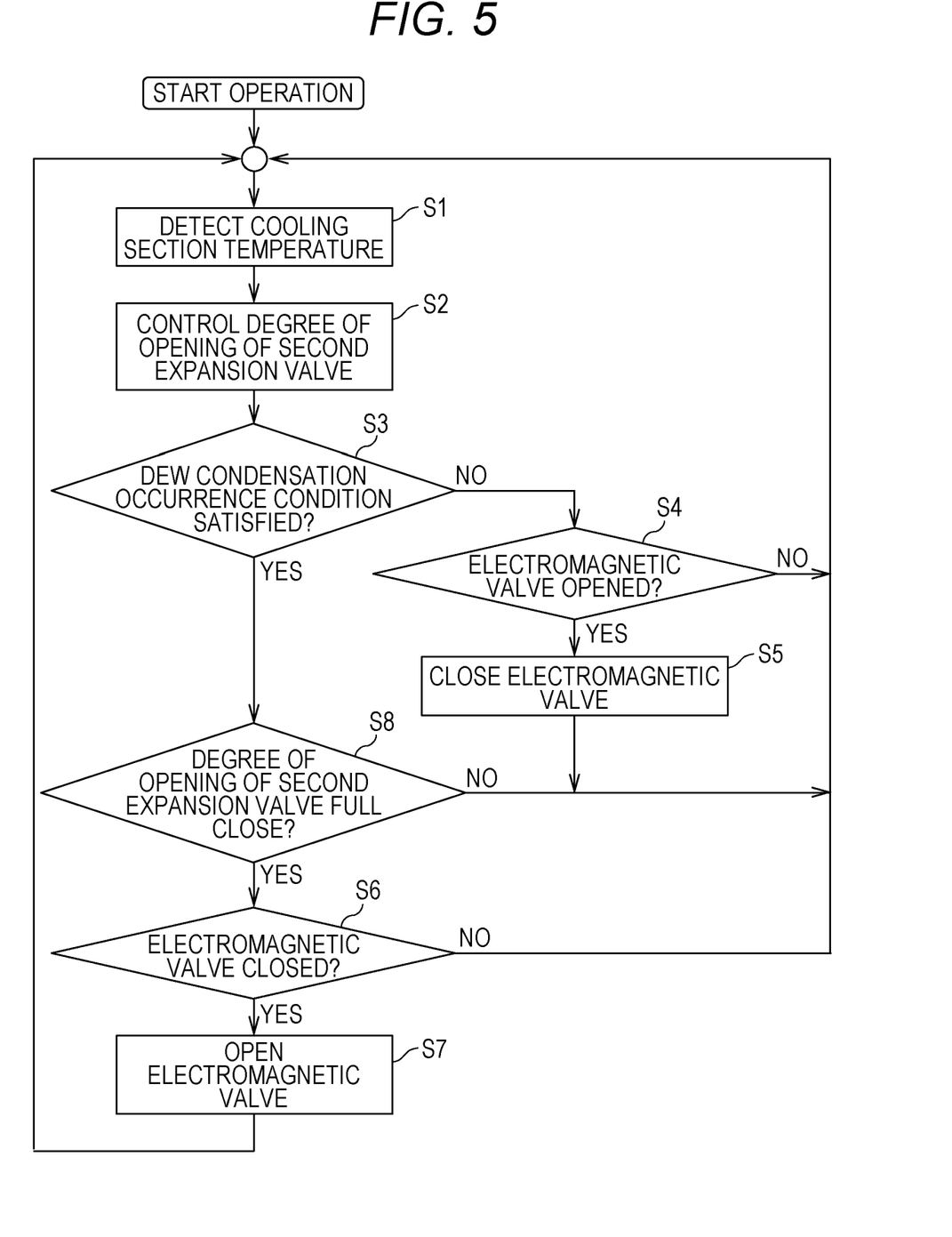
FIG. 5 is a control flow chart of an air conditioner of a second embodiment.

FIG. 5 illustrates a control flowchart of an air conditioner 1 of a second embodiment.

When an electromagnetic valve 50 of a discharged gas branching refrigerant circuit 6 is opened such that refrigerant flows from a main refrigerant circuit 4 to a branched refrigerant circuit 5, the amount of refrigerant in the main refrigerant circuit 4 is decreased, and a cooling/heating capacity is influenced.

For this reason, in the second embodiment, opening of the electromagnetic valve 50 is reduced such that lowering of the cooling/heating capacity is suppressed.

A control flow of the second embodiment is partially the same as that of the first embodiment illustrated in FIG. 4, and therefore, only control different from that of the first embodiment will be described.

Unlike the first embodiment, in a case where a dew condensation occurrence condition is satisfied at a step S3 (YES at the step S3), a control section 60 transitions to a step S8 (FIG. 5) in the second embodiment.

At the step S8, the control section 60 determines whether or not a second expansion valve 43 is fully closed. This is because even when the second expansion valve 43 is fully closed, the electromagnetic valve 50 is opened to use the discharged gas branching refrigerant circuit 6 for the purpose of prevention of dew condensation as far as the temperatures of power elements 31, 32 are not increased.

In a case where the second expansion valve 43 is not fully closed (NO at the step S8), there is room for decreasing the degree of opening of the second expansion valve 43, and therefore, the processing returns to a step S1.

In a case where the second expansion valve 43 is fully closed (YES at the step S8), there is no room for decreasing the degree of opening of the second expansion valve 43, and therefore, the processing transitions to a step S6.

As described above, when the electromagnetic valve 50 is opened such that part of gas refrigerant discharged from first and second compressors 11, 12 flows into the discharged gas branching refrigerant circuit 6, the flow rate of refrigerant flowing in a heat source side heat exchanger 13 decreases to lower a cooling capacity in cooling operation, and the flow rate of refrigerant flowing in a utilization side heat exchanger 16 decreases to lower a heating capacity in heating operation. Thus, it is better to reduce excessive opening/closing of the electromagnetic valve 50.

As described in the first embodiment, in a case where the temperatures of cooling members 41, 42 fall below a dew condensation temperature, the control section 60 controls the second expansion valve 43 in a closing direction, and therefore, the flow rate of refrigerant flowing in the second expansion valve 43 is decreased. Thus, in the second embodiment, even when the second expansion valve 43 is closed to decrease the flow rate of refrigerant flowing in the cooling members 41, 42 and the cooling capacity of a cooler is lowered, the electromagnetic valve 50 is opened only in a case where the temperatures of the cooling members 41, 42 fall below the dew condensation temperature.

At the step S6, the control section 60 determines whether or not the electromagnetic valve 50 is closed.

In a case where the electromagnetic valve 50 is not closed, i.e., the electromagnetic valve 50 is opened (NO at the step S6), the processing returns to the step S1.

In a case where the electromagnetic valve 50 is closed (YES at the step S6), the processing transitions to a step S7, and the control section 60 opens the electromagnetic valve 50. Thereafter, the control section 60 returns to the step S1.

By the control above, excessive opening/closing of the electromagnetic valve 50 can be reduced. Excessive opening/closing of the electromagnetic valve 50 is reduced so that lowering of the cooling capacity and the heating capacity in the case of using the discharged gas branching refrigerant circuit 6 can be suppressed.

Third Embodiment

Figure 6:
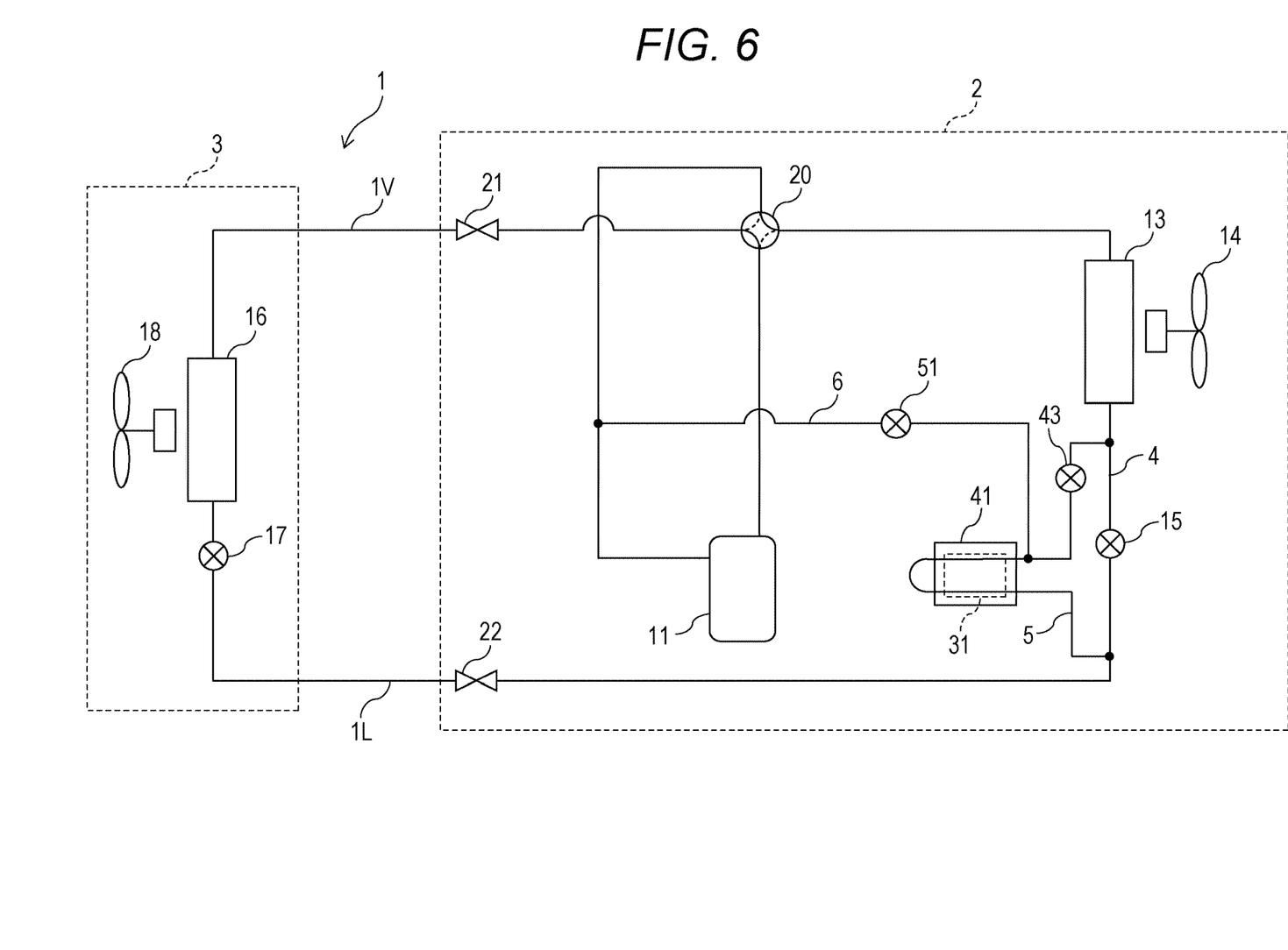
FIG. 6 is a diagram of one example of a refrigeration cycle of an air conditioner according to a third embodiment.

FIG. 6 is a diagram of one example of a refrigeration cycle of an air conditioner 1 according to a third embodiment.

In the first embodiment illustrated in FIG. 1A, the refrigerant circuit configured such that the multiple first and second compressors 11, 12, the multiple power elements 31, 32, and the multiple cooling members 41, 42 are provided at the heat source device 2 has been described as an example, but the present disclosure is not limited to above. As illustrated in FIG. 6, a refrigerant circuit configured such that a single compressor 11, a single power element 31, and a single cooling member 41 are provided at a heat source device 2 may be employed. Moreover, in FIG. 6, an expansion valve 51 is used instead of an electromagnetic valve 50. The degree of opening of the expansion valve 51 is controlled so that the percentage of the flow rate of refrigerant flowing into a discharged gas branching refrigerant circuit 6 with respect to gas refrigerant discharged from the compressor 11 can be adjusted.

Figure 7:
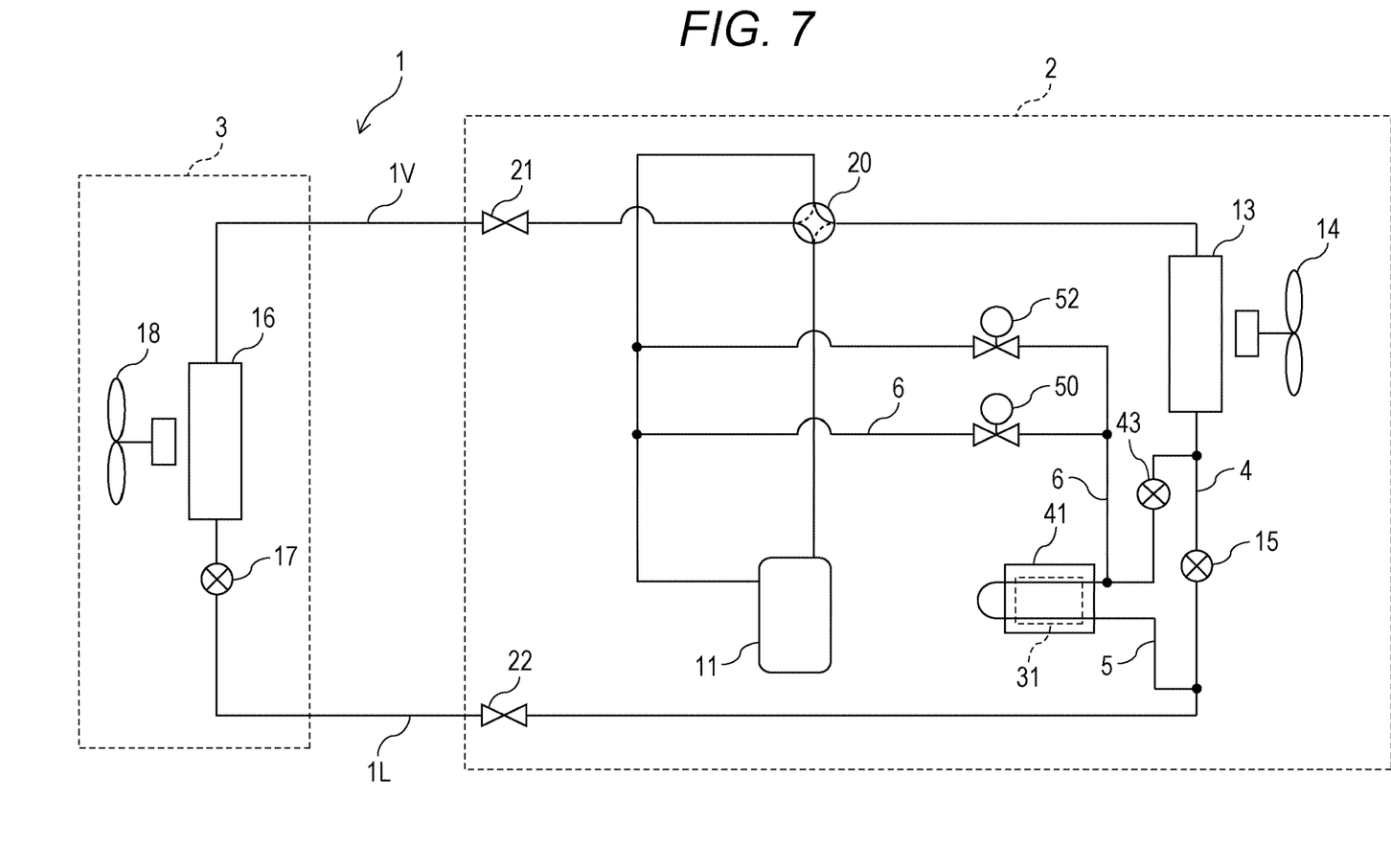
FIG. 7 is a diagram of another example of the refrigeration cycle of the air conditioner according to the third embodiment.

FIG. 7 is a diagram of another example of the refrigeration cycle of the air conditioner 1 according to the third embodiment.

As illustrated in FIG. 7, the discharged gas branching refrigerant circuit 6 may include multiple electromagnetic valves 50, 52. The multiple electromagnetic valves 50, 52 are opened/closed so that the percentage of the flow rate of refrigerant flowing into the discharged gas branching refrigerant circuit 6 with respect to gas refrigerant discharged from the compressor 11 can be finely adjusted, i.e., fine-adjusted.

Fourth Embodiment

In the embodiment illustrated in FIG. 1A, the discharged gas branching refrigerant circuit 6 is branched from the portion between each of the first and second compressors 11, 12 and the four-way valve 20 in the main refrigerant circuit 4, and joins the portion between the second expansion valve 43 and the cooling member 41, 42. However, the present disclosure is not limited to above.

Figure 8:
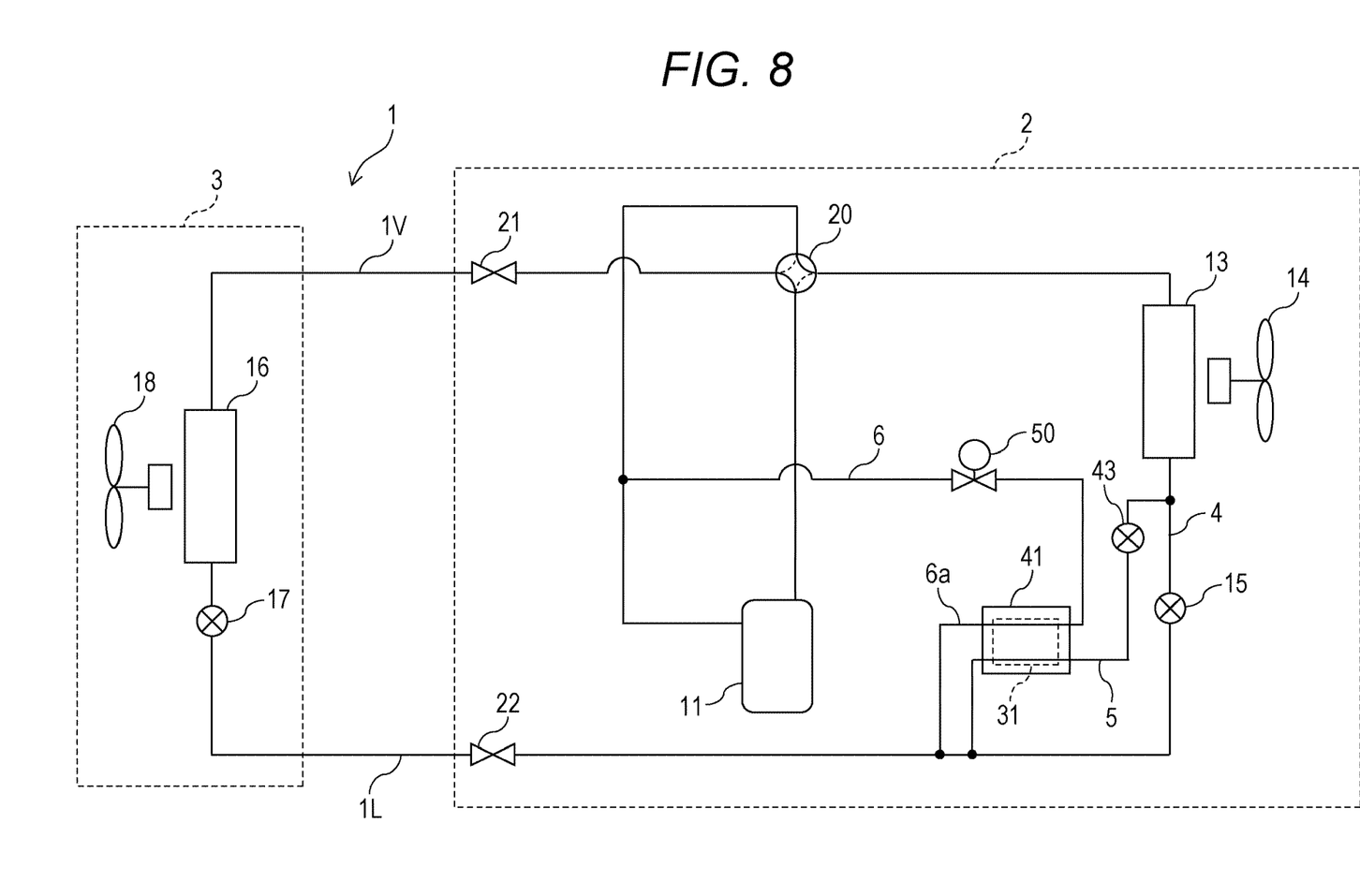
FIG. 8 is a diagram of one example of a refrigeration cycle of an air conditioner according to a fourth embodiment.

FIG. 8 is a diagram of one example of a refrigeration cycle of an air conditioner 1 according to a fourth embodiment.

In the fourth embodiment, it is configured such that a pipe 6a of a discharged gas branching refrigerant circuit 6 extends in parallel with a branched refrigerant circuit 5 through a cooling member 41 and joins a portion between a first expansion valve 15 and a liquid side closing valve 22. In the fourth embodiment, when an electromagnetic valve 50 is opened, part of high-pressure high-temperature gas refrigerant discharged from a compressor 11 flows into the discharged gas branching refrigerant circuit 6 from a portion between the compressor 11 and a four-way valve 20, and flows in the cooling member 41 of the branched refrigerant circuit 5. Then, the refrigerant joins a main refrigerant circuit 4 between the first expansion valve 15 and the liquid side closing valve 22.

Thus, high-pressure gas from the discharged gas branching refrigerant circuit 6 can flow in the cooling member 41 regardless of opening/closing of a second expansion valve 43.

In this case, refrigerant from the discharged gas branching refrigerant circuit 6 flows in the cooling member 41, and therefore, a cooling section temperature (the temperatures of the cooling member 41 and a power element 31) can be increased. Thus, occurrence of dew condensation at the power element 31 and the periphery thereof can be reduced.

<<Variations>>

In the above-described first embodiment, the cooling members 41, 42 illustrated in FIGS. 2A and 2B have been described as an example, but the present disclosure is not limited to above. FIGS. 9A to 9D are schematic views of first to fourth variations of the cooling members 41, 42 of the first embodiment. Note that arrows in FIGS. 9A to 9D indicate a refrigerant flow.

Figure 9A:
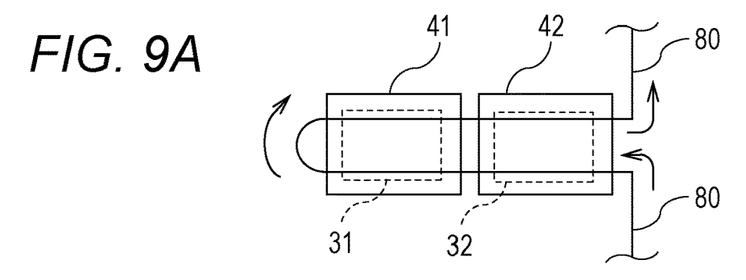
FIG. 9A is a schematic view of a first variation of cooling members of the first embodiment.

In the first variation illustrated in FIG. 9A, refrigerant flows in the cooling member 42 configured to cool the power element 32, the cooling member 41 configured to cool the power element 31, the cooling member 41, and the cooling member 42 in this order in a pipe 80 forming the branched refrigerant circuit 5.

Figure 9B:
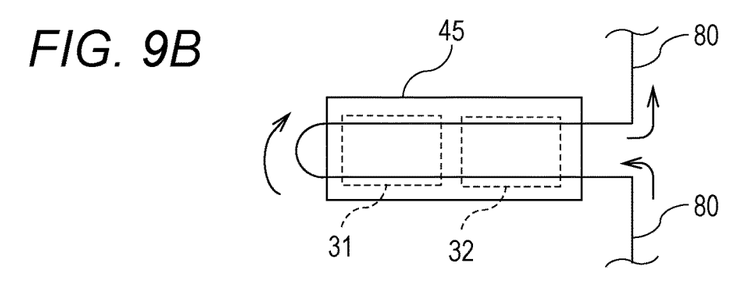
FIG. 9B is a schematic view of a second variation of the cooling members of the first embodiment.

In the second variation illustrated in FIG. 9B, the cooling members 41, 42 are replaced with a single refrigerant jacket 45 configured to cool the power element 31 and the power element 32.

Figure 9C:
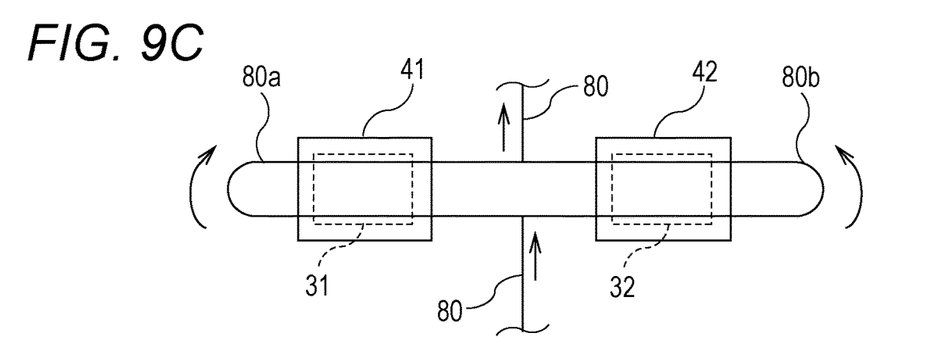
FIG. 9C is a schematic view of a third variation of the cooling members of the first embodiment.

In the third variation illustrated in FIG. 9C, the cooling member 41 is a refrigerant jacket configured to cool the power element 31, and the cooling member 42 is a refrigerant jacket configured to cool the power element 32. The cooling member 41 is attached to a cooling section 80a as part of the refrigerant pipe 80. The cooling member 42 is attached to a cooling section 80b as part of the refrigerant pipe 80. In the third variation, the cooling section 80a and the cooling section 80b are connected in parallel with each other with respect to upstream and downstream sides of the pipe 80.

Figure 9D:
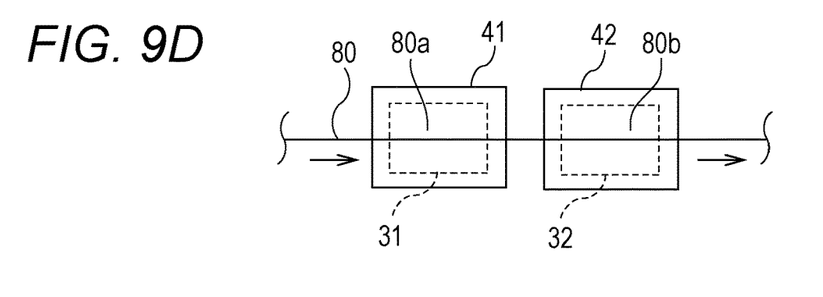
FIG. 9D is a schematic view of a fourth variation of the cooling members of the first embodiment.

In the fourth variation illustrated in FIG. 9D, the cooling sections 80a, 80b are not bent in a U-shape as in the first to fourth embodiments and the first to third variations, and extend substantially linearly.

Other Embodiments

1. Note that in the above-described embodiments, the power elements 31, 32 have been described as an example of the heat generator targeted for cooling, but the heat generator may be other elements than the power elements 31, 32 as long as the heat generator is an object generating heat.

2. Note that the present invention embodiment is not limited to the above-described embodiments and variations, and includes various modifications. For example, the above-described embodiments are for detailed description for the sake of easy understanding of the present embodiment, and are not limited to those including all of the configurations described above. Moreover, for some of the configurations of the embodiments, addition/omission/replacement of other configurations may be made.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An air conditioner comprising:
    a main refrigerant circuit including a compressor, a heat source side heat exchanger, a first expansion valve, and a utilization side heat exchanger and configured such that refrigerant flows in the main refrigerant circuit;
    a sub refrigerant circuit including a cooling member configured such that refrigerant branched from the main refrigerant circuit flows in the cooling member and configured such that refrigerant branched from the main refrigerant circuit flows in the sub refrigerant circuit; and
    a heat generator to be cooled by the cooling member,
    wherein a first pipe in which part of refrigerant discharged from the compressor flows is connected to the cooling member of the sub refrigerant circuit,
    wherein the sub refrigerant circuit includes a second pipe branched from the main refrigerant circuit that is embedded into the cooling member,
    wherein a second expansion valve is disposed on the second pipe, and
    wherein the first pipe connects to the second pipe of the sub refrigerant circuit between the cooling member and the second expansion valve.

2. The air conditioner according to claim 1, wherein the cooling member includes multiple cooling members.

3. The air conditioner according to claim 1, wherein a flow rate of refrigerant flowing in the sub refrigerant circuit is lower than a flow rate of refrigerant flowing in the main refrigerant circuit.

4. The air conditioner according to claim 2, wherein the compressor includes a first compressor and a second compressor,
    the heat generator includes a first heat generator for controlling the first compressor and a second heat generator for controlling the second compressor, and
    the first heat generator and the second heat generator are cooled by the multiple cooling members.

5. The air conditioner according to claim 1, wherein the second expansion valve is configured to expand refrigerant flowing into the cooling member.

6. The air conditioner according to claim 1, wherein the second expansion valve is configured to expand refrigerant flowing into the cooling member, and
    wherein a control section is configured to perform control such that the second expansion valve is operated in a closing direction in a case where a cooling capacity of the cooling member needs to be lowered and perform control such that part of refrigerant discharged from the compressor flows into the cooling member in a case where the cooling capacity of the cooling member needs to be further lowered.

7. An air conditioner comprising:
a main refrigerant circuit including a compressor, a heat source side heat exchanger, a first expansion valve, and a utilization side heat exchanger and configured such that refrigerant flows in the main refrigerant circuit;
a sub refrigerant circuit including a cooling member configured such that refrigerant branched from the main refrigerant circuit flows in the cooling member and configured such that refrigerant branched from the main refrigerant circuit flows in the sub refrigerant circuit;
a heat generator to be cooled by the cooling member; and
a first pipe embedded into the cooling member through which part of refrigerant discharged from the compressor flows into the cooling member,
wherein the sub refrigerant includes a second pipe embedded into the cooling member and one end of the second pipe is connected to the main refrigerant circuit and another end of the second pipe is connected to the main refrigerant circuit, and
wherein one end of the first pipe is connected to the main refrigerant circuit.

* * * * *